(12) United States Patent
Ozhan et al.

(10) Patent No.: US 12,130,447 B2
(45) Date of Patent: Oct. 29, 2024

(54) ADHESIVE FOR MIDDLE FAR INFRA-RED OPTICAL ELEMENTS AND BEAM SPLITTER PRISM SET WHERE AN ADHESIVE IS USED

(71) Applicant: ASELSAN ELEKTRONIK SANAYI VE TICARET ANONIM SIRKETI, Ankara (TR)

(72) Inventors: Alp Eren Sinan Ozhan, Ankara (TR); Ahmet Macit Ozenbas, Ankara (TR); Gülgün Hamide Aydogdu Kuru, Ankara (TR); Halil Ibrahim Yavuz, Ankara (TR); Haci Batman, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 1021 days.

(21) Appl. No.: 17/055,141

(22) PCT Filed: Apr. 29, 2019

(86) PCT No.: PCT/TR2019/050286
§ 371 (c)(1),
(2) Date: Nov. 13, 2020

(87) PCT Pub. No.: WO2020/032884
PCT Pub. Date: Feb. 13, 2020

(65) Prior Publication Data
US 2021/0191135 A1    Jun. 24, 2021

(30) Foreign Application Priority Data

May 14, 2018  (TR) .................................. 2018/06798

(51) Int. Cl.
*G02B 27/10* (2006.01)
*G02B 1/11* (2015.01)
(Continued)

(52) U.S. Cl.
CPC ............ *G02B 27/1006* (2013.01); *G02B 1/11* (2013.01); *G02B 5/04* (2013.01); *G02B 27/126* (2013.01); *G02B 27/142* (2013.01)

(58) Field of Classification Search
None
See application file for complete search history.

(56) References Cited

U.S. PATENT DOCUMENTS

| | | | |
|---|---|---|---|
| 4,733,926 A | 3/1988 | Title | |
| 5,683,480 A * | 11/1997 | Taniguchi | G02B 27/126 359/638 |
| 6,212,014 B1 | 4/2001 | Lehman, Jr. et al. | |

FOREIGN PATENT DOCUMENTS

| | | | |
|---|---|---|---|
| JP | 08234021 A | * | 9/1996 |
| JP | 2008225210 A | | 9/2008 |
| JP | 2008299244 A | | 12/2008 |

* cited by examiner

*Primary Examiner* — Bao-Luan Q Le
*Assistant Examiner* — Danell L Owens
(74) *Attorney, Agent, or Firm* — Bayramoglu Law Offices LLC (57) ABSTRACT

An adhesive with a refractive index of 2.0 and over is transparent at an infra-red band. A production method of the adhesive and a beam splitter prism set is provided. The beam splitter prism set separates middle and far infra-red beam paths for electro-optical monitoring systems according to wavelengths of the middle and far infra-red beam paths, wherein in the electro-optical monitoring systems the adhesive is used.

15 Claims, 5 Drawing Sheets

(51) Int. Cl.
*G02B 5/04* (2006.01)
*G02B 27/12* (2006.01)
*G02B 27/14* (2006.01)

ADHESIVE FOR MIDDLE FAR INFRA-RED OPTICAL ELEMENTS AND BEAM SPLITTER PRISM SET WHERE AN ADHESIVE IS USED

CROSS REFERENCE TO THE RELATED APPLICATION

This application is the national stage entry of International Application No. PCT/TR2019/050286, filed on Apr. 29, 2019, which is based upon and claims priority to Turkish Patent Application No. 2018/06798, filed on May 14, 2018, the entire contents of which are incorporated herein by reference.

TECHNICAL FIELD

The present disclosure is related to a transparent adhesive for middle and far infra-red beams, production method of mentioned adhesive and a beam splitter prism set which separates middle and far infra-red beam paths for electro-optical monitoring systems according to their wavelength's.

BACKGROUND

Electro-optical monitoring systems can have various features such as operating by using beams from different wavelengths, having different point of views, enabling thermal monitoring, having photon multiplexer, and enabling black-white or colored view. In electro-optical monitoring systems, the beams coming from the external environment to the system are fallen onto an optical sensor transmitting through various optical units (lens, prism etc.). Beams in mentioned wavelength transformed into a view by means of the optical sensors which is sensitive to the beams between selected wavelengths. In some electro-optical monitoring systems a plurality of sensors can be used. As an example, two optical sensors which are sensitive to the beams with different wavelengths for mentioned two views in systems where thermal monitoring and daytime monitoring are provided together, are used. In systems which have a plurality of sensors, instead of using a separate optical unit for each optical sensor, in some cases a single optical unit can be jointly used (for example jointly using tele-zoom lens). After the beam transmits through a single optical unit, it is separated into wavelengths according to the sensitivity of the optical sensor, and directed to the optical sensors at the relevant wavelength. Jointly using a single optical unit provides significant improvements in the total weight and cost of the electro-optical monitoring system.

In general, two different beam splitter units are uses for the separation of the beams transmitting from the optical unit and orientation of the beams to the optical sensors. One of these units are a beam splitter prism sets and the other are beam splitter plates. If the beams coming to the beam splitter units are parallel, there will not be significant differences between the advantages of the beam splitter prism sets and beam splitter plates. However if the beams coming are not parallel (in optical units in general the beams converge towards each other or move away from each other while they are transmitted through the lens), the important advantages of beam splitter prism sets are occurred, in eliminating the defects (particularly aberration) formed on the image at the focal plane. The ability of the systems where beam splitter plate is used, in respect to improving defects formed on the image is lower than the systems in which beam splitter prism set is used. In order to correct the defects in systems where the beam splitter prism set is used, a less number of and less complex optical components are required. Due to mentioned advantages, in visible and close infra-red wave bands, beam splitter prism sets are commonly used for a long time. Beam splitter prism sets are basically obtained by joining two triangular prisms optically by means of a transparent adhesive and coating prism surfaces with thin films having various features. In order to use mentioned adhesive in beam splitter prism sets, it has to fulfill some characteristics. The adhesive shall have the following characteristics;

The refractive index shall have the refractive index value of at least one of the triangle prisms to be joined or shall be close to its refractive index, It shall have a good adhesive characteristic, It shall be optically transparent within the relevant wavelength band, It shall be dried within an industrially acceptable duration after the joining process, It shall protect cold, warm, moisture etc. integrity within selected ambient condition values, and continue its function, It shall have a low gas release, It shall not harm human health during assembly and operation processes, shall be non-poisonous.

The thermal monitoring systems among the popular electro-optical monitoring systems are operated in the direction of different aims with beams within two main wavelengths such as in general middle (3.0-5.0 µm) and far (8.0-12.0 µm) infra-red beams. Therefore two separate optical sensors which are sensitive against middle (3.0-5.0 µm)-far (8.0-12.0 µm) infrared wavelength bands are used in these systems. Due to abovementioned advantages, in thermal monitoring systems, beam splitter prism sets are also desired to be used. However refractive indexes of the optical unit materials, elements in electro-optical systems where middle-far infra-red beams are used and triangle prisms to be used in beam splitter sets are significantly high. The refractive index value of mentioned optical units is generally more than 2.0. The refractive index of an adhesive to be used for joining the optical units must be close to the refractive index value of the optical units. If there is significant difference between mentioned refractive indexes, critical values determined according to Snell law will be very small. Therefore due to mentioned small critical angle, the coming beam will follow a different path instead of transmitting over the optical units. In a similar manner in case the refractive index of the adhesive to be used for joining the prisms in the beam splitter prism sets is significantly differently from the refractive indexes of the prisms, the critical angles will be very small. Therefore due to mentioned small critical value, coming beam will follow a different path by being reflected instead of transmitting over prisms. For this reason the refractive index of the adhesive to be used for joining the prisms in the beam splitter prism sets shall have a similar value with the refractive index of the prisms. Due to lack of a transparent adhesive in middle-far infra-red wavelength bands having particularly high refractive index and previously mentioned features, beam splitter prisms as far it is known are not used within the thermal monitoring systems operating in middle-far infra-red wavelength intervals.

SUMMARY

In the present disclosure, a transparent adhesive having high refractive index, for middle (3.0-5.0 µm) and far (8.0-12.0 µm) infra-red beams, for the production method of the adhesive and a beam splitter prism set is described which separates middle and far infra-red beam paths, where mentioned adhesive is used in electro-optical monitoring systems.

BRIEF DESCRIPTION OF THE DRAWINGS

In order to better understand the present invention, its exemplary embodiment is shown in the attached figures. The details of the present disclosure shall be evaluated by taking the whole description into consideration. These figures are as the following.

Parts in the figures are numbered one by one, the parts correspond to these numbers are given below.
4. Beam splitter prism set
5. First prism
6. Second prism
A. A surface
B. B surface
C. C surface
D. D surface
E. E surface
I1. Middle (3-5 μm) infra-red beam
I2. Far (8-12 μm) infra-red beam
S1. Optical sensor sensitive to the middle (3-5 μm) infra-red beams
S2. Optical sensor sensitive to the far (8-12 μm) infra-red beams
O. Optical unit
GS. Electro-optical monitoring system
NTE. Nano $TiO_2$ solution curve
TBE. Ti(IV) butox solution curve

DETAILED DESCRIPTION OF THE EMBODIMENTS

An Adhesive for Middle-Far Infra-Red Optical Elements

A metallic-nonmetallic composition for optical elements (lens, prism etc.) used for middle-far infra-red beams of the present disclosure which comprises all metal oxide and sulfides within organic or inorganic $M_yA_x$ salt formulation in which x, y is any number, preferably between 1-5, adhesive M is one of the Hf, Zn, Ni, Ti, Y elements and A is one of the O, S elements.

In a preferred embodiment of the present invention, Ti(IV) Ax is used by selecting Ti for M and IV for y.

The adhesive can be used for joining the prisms to be used for optical units (O) for middle (3.0-5.0 μm) and far (8.0-12.0 μm) infra-red beams, for example lenses and particularly prisms for middle-far beam splitting. The refractive index of the adhesive is 2.0 and above that value, it is transparent in the infra-red band. In a preferred embodiment of the present invention, the refractive index of the adhesive is 2.25. However, the adhesive has required features such as good adhesion, ability of drying within an industrially acceptable duration, ability of protecting its integrity and continue its function under predetermined ambient conditions (cold −40°, hot +70°, moisture etc.), having low gas release, not being harmful to human health during assembly and operation processes. As a result an adhesive with high refractive index and transparent at the infra-red wave band is created. The adhesive allows for joining optical elements which have high refractive indexes. Due to protecting its integrity in difficult conditions and continuing its functionality, the adhesive allows for using the devices (for example electro-optical monitoring system (GS)) where optical elements and/or beam splitter prism sets (1) are used in said conditions.

In a preferred embodiment of the present invention an adhesive in a solid phase is used. An adhesive in a liquid form causes the formation of gaps where loss of light occurs. The refractive index of the adhesive in liquid form changes at high temperatures and it can freeze in cold environments. Also the adhesive in liquid form has a risk of leakage at high altitudes. The technical problems encountered with the adhesives at liquid phase are eliminated by using the adhesive at solid phase.

Production Method of the Adhesive in Ti(IV) Ax Formulation in a Preferred Embodiment of the Present Invention The adhesive for optical elements used for middle (3.0-5.0 μm)-far (8.0-12.0 μm) infra-red beams of the present invention is produced from sol-gel based solution. In the adhesive production method, an adhesive with anatase structure is obtained as a result of dissolving a component (starter material) of the Ti(IV) R formulation where for organic R isopropoxide, butoxide are used or for inorganic R chloride salts are used. Together with dissolving the starter material within the solution, a transparent adhesive is obtained for middle-far infra-red beams.

In a preferred embodiment of the present invention, the adhesive with an anatase structure is transformed into a gel solution by means of the sol-gel method. Mentioned gel solution formation process is performed by dissolving Ti(IV) butoxide (preferably 97% isopropanol solution of Ti(IV) butoxide) or nano $TiO_2$ solution in isopropanol alcohol and by mixing the obtained mixture preferably for 20 minutes.

Middle-Far Infra-Red Beam splitter Prism Set (1)

Figure 1:
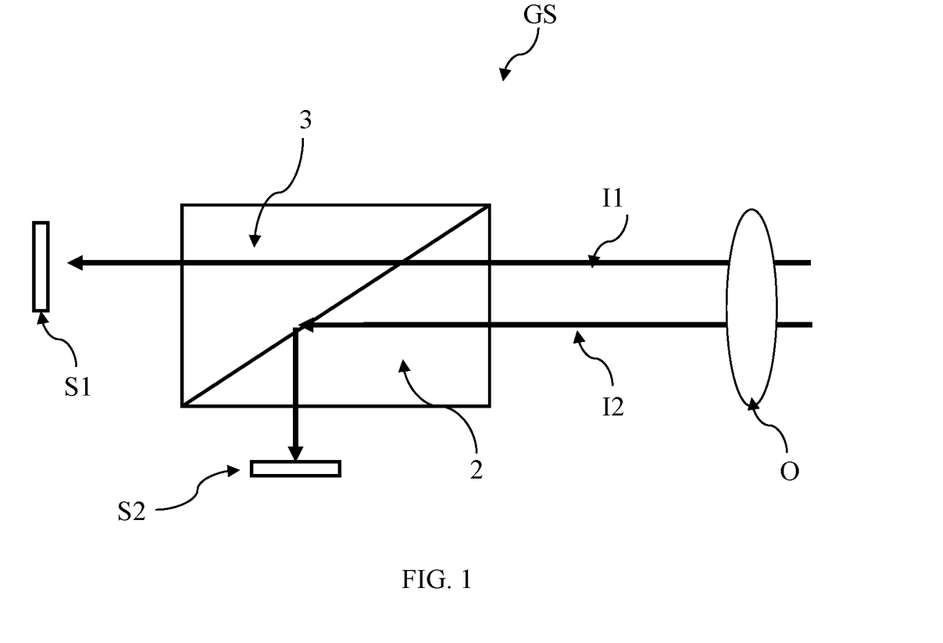
FIG. 1 is a schematic view of the usage of the prism set in the electro-optical monitoring systems in one embodiment of the invention.

The subject of the invention is a beam splitter prism set (1) for electro-optical monitoring systems (GS) using middle and far infra-red beams. Beam splitter prism set (1) only transmits middle (3.0-5.0 μm) and far (8.0-12.0 μm) infra-red beams through an optical unit (O) and it separates middle-far infra-red beam paths. Thus, middle and far infra-red beams which their beam paths were separated are oriented to the relevant sensors in the electro-optical monitoring systems (GS). [Optical sensor (S1) sensitive to the near (3-5 μm) infra-red beams and optical sensor (S2) sensitive to the far (8-12 μm) infra-red beams, see FIG. 1]. As a result of separating the middle-far infra-red beam paths by means of the beam splitter prism set (1), the faults (aberration) are eliminated from the views created in the electro-optical monitoring systems (GS).

Figure 2:
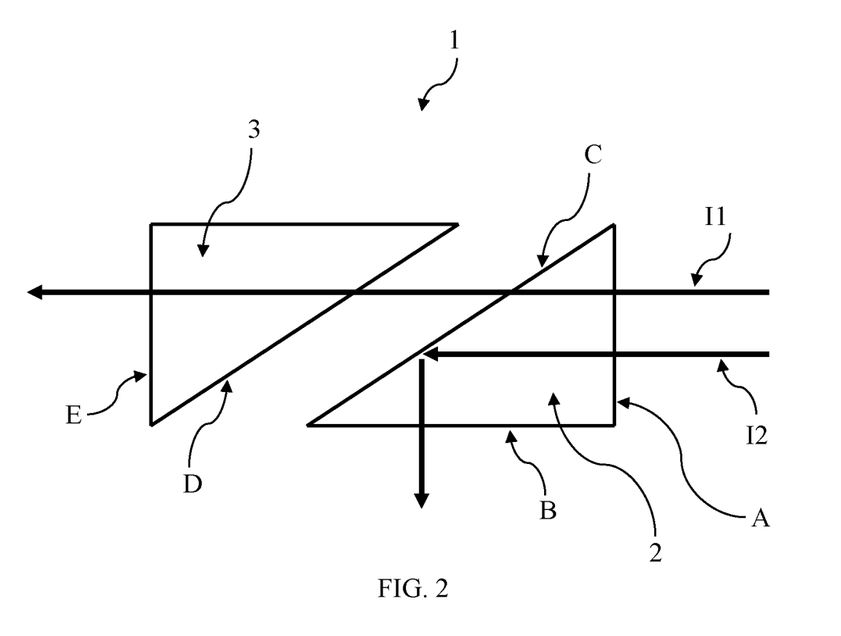
FIG. 2 is a schematic view of the beam splitter prism set in one embodiment of the invention.

Beam splitter prism set (1) comprises two optical right triangular prisms such as a first prism (2) and a second prism (3) whose hypotenuses are positioned in a manner facing each other. The first prism (2) and second prism (3) consists of a material in ZnX formulation wherein X is Se or S element (Zn=zinc). In a preferred embodiment of the present invention, the first prism (2) is manufactured from ZnSe material and the second prism (3) is manufactured from ZnS material. In another embodiment of the present invention first prism (2) is ZnSe and second prism (3) is ZnSe.

The section which faces the coming beam first is a vertical surface (A) of the first prism (2). The A surface (A) is coated with an antireflection optical coating which only transmits middle and far infra-red beams. Therefore the beam coming to the A surface (A) is filtered and only middle and far infra-red beams can penetrate into the first prism (2).

In one embodiment of the present invention another vertical B surface (B) of the first prism (2) is coated with an antireflection optical coat which only transmits far (8-12 μm) infra-red beams (I2). Thus the transmission of only far (8-12 μm) infra-red beam (I2) through the B surface (B) to the ambient is guaranteed. As a result only far (8-12 μm) infra-red beams (I2) are transmitted to the optical sensors (S2) which are sensitive to the far (8-12 μm) infra-red beams to be located against the B surface (B). A vertical E surface (E) of the second prism (3) which is parallel with the A surface (A) is coated with an antireflection optical coating which only transmits middle (3-5 μm) infra-red beams (I1). Thus the transmission of only middle (3-5 μm) infra-red beams (I1) through the E surface (E) to the ambient is guaranteed. As a result only middle (3-5 μm) infra-red beams (I1) are transmitted to the optical sensors (S1) which are sensitive to the middle (3-5 μm) infra-red beams to be located against the E surface (E). The first prism (2) and second prism (3) are joined in a manner such that a hypotenuse C surface (C) of the first prism (2) and a hypotenuse D surface (D) of the second prism (3) face each other. The angle between the C surface (C) and the B surface (B) are determined previously and in a preferred embodiment of the present invention said angle is approximately 45°. There is an optical coat between the C surface (C) and D surface (D) which reflects far infra-red beams and transmits middle infra-red beams. Mentioned optical coating can be coated onto the C surface (C) or D surface (D). In case mentioned optical coating in layers is used, the layers can be allotted and coated on the C surface (C) and D surface (D). Thus far infra-red beams are reflected from the joint face and reaches to the B surface (B) and middle infra-red beams transmits through the joint face and reaches to the E surface (E) (see FIG. 1 and FIG. 2).

The coatings within the embodiments of the invention are preferably in a thin film form. C surface (C) and D surface (D) are joined with an adhesive which has same or near refractive index of the refractive indexes of the first prism (2) or second prism (3). Preferably the refractive index of the uncoated surface is taken as a reference and the adhesive is performed.

Joining C surface (C) and D surface (D) with each others is performed by means of the adhesive in the previously described MyAx formulation. In a preferred embodiment of the present invention, Ti is selected for M and IV is selected for y and Ti(IV) Ax is used. In order to adhere C surface (C) and D surface (D) to each other, an adhesive in any embodiment described under the heading "An Adhesive for Middle-Far Infra-red Optical Elements" can be used.

In one embodiment of the present invention, when the first prism (2) and the second prism (3) is joined, in order to strengthen the joint between the C surface (C) and D surface (D), for increasing the adhesion force, there is a $TiO_2$ interlayer between the C surface (C) and D surface (D) with an anatase structure.

Figure 3:
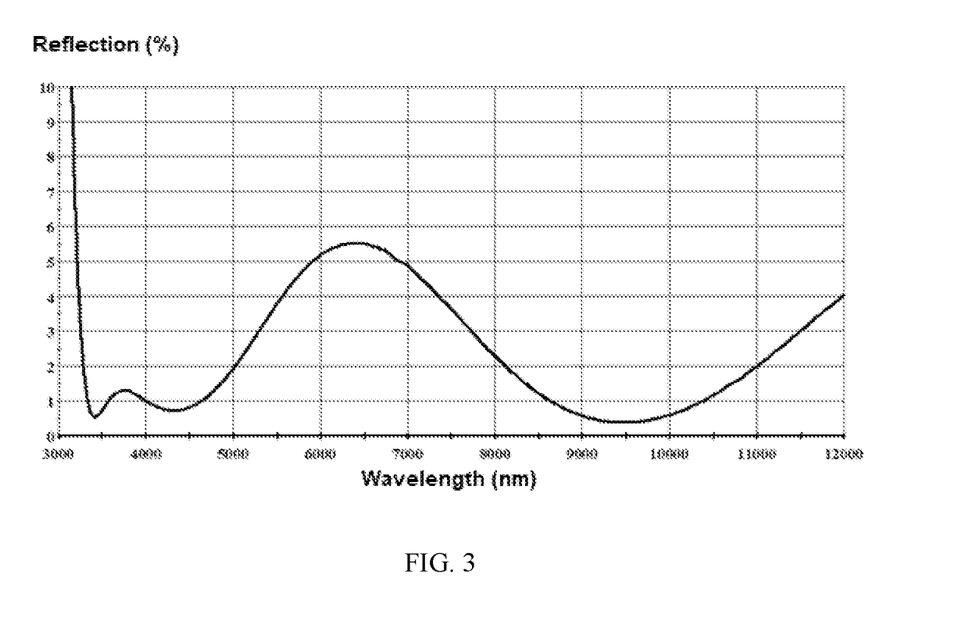
FIG. 3 is a reflection graph of antireflection optical coating which transmits only middle and far infra-red beams in one embodiment of the invention.

Antireflection optical coating layers which only transmit middle and far infra-red beams in one embodiment of the present invention are given in the following table 1. This exemplary embodiment is an optical coating to be applied on the A surface (A) of the first prism in ZnSe formulation. In the example reference wavelength is 10000 nm and its coming angle is 0°. Also in mentioned exemplary embodiment, the refractive graph of the optical coating is shown in the following table 4.

TABLE 1

| Layer | Material | Refractive Index | Optical Thickness (QWOT) | Physical Thickness (nm) |
|---|---|---|---|---|
| Ambient | Air | 1 | | |
| 1 | ZnS | 2.24 | 0.02 | 25.46 |
| 2 | YbF$_3$ | 1.53 | 0.57 | 939.10 |
| 3 | Ge | 4.20 | 0.08 | 45.03 |
| 4 | YbF$_3$ | 1.53 | 0.29 | 480.17 |
| 5 | Ge | 4.20 | 0.09 | 53.11 |
| 6 | ZnS | 2.24 | 0.42 | 476.46 |
| 7 | Ge | 4.20 | 0.11 | 68.05 |
| 8 | ZnS | 2.24 | 0.30 | 329.45 |
| 9 | Ge | 4.20 | 0.05 | 27.40 |
| Substrate | ZnSe | 2.39 | | |
| Total thickness | | | 1.93 | 2444.23 |

Figure 4:
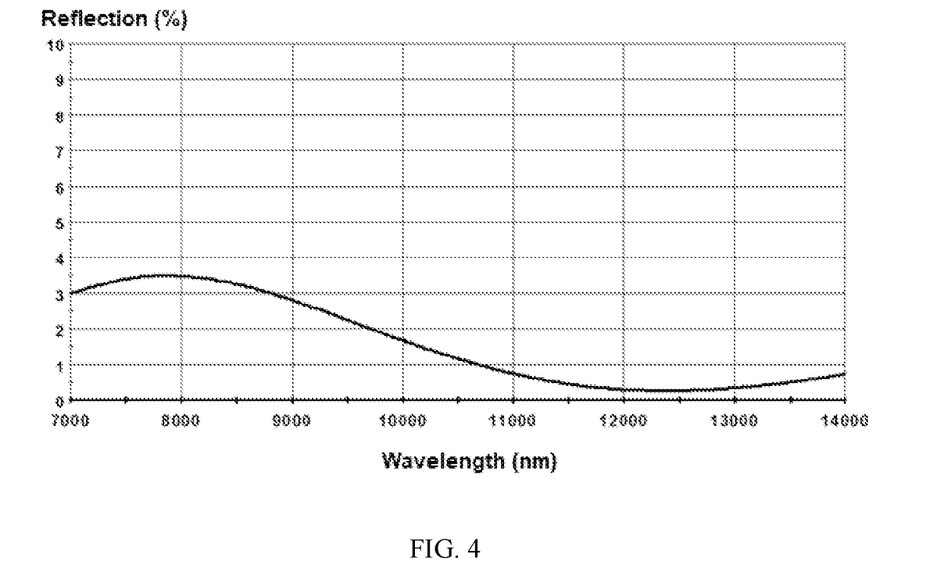
FIG. 4 is a reflection graph of antireflection optical coating which transmits only far infra-red beams in one embodiment of the invention.

The antireflection optical coating layers which only transmits far infra-red beams in one exemplary embodiment of the present invention is given in the following Table 2. This exemplary embodiment is the optical coating to be coated onto the B surface (B) of the first prism (2). In the example reference wavelength is 10500 nm and its coming angle is 0°. Also in mentioned exemplary embodiment, the refractive graph of the optical coating is shown in the following table 5.

TABLE 2

| Layer | Material | Refractive Index | Optical Thickness (QWOT) | Physical Thickness (nm) |
|---|---|---|---|---|
| Ambient | Air | 1 | | |
| 1 | Zns | 2.24 | 0.05 | 58 |
| 2 | YbF$_3$ | 1.48 | 0.87 | 1535 |
| 3 | Zns | 2.24 | 0.32 | 380 |
| 4 | YbF$_3$ | 1.48 | 0.16 | 287 |
| Substrate | ZnSe | 2.40 | | |
| Total thickness | | | 1.40 | 2260 |

Figure 5:
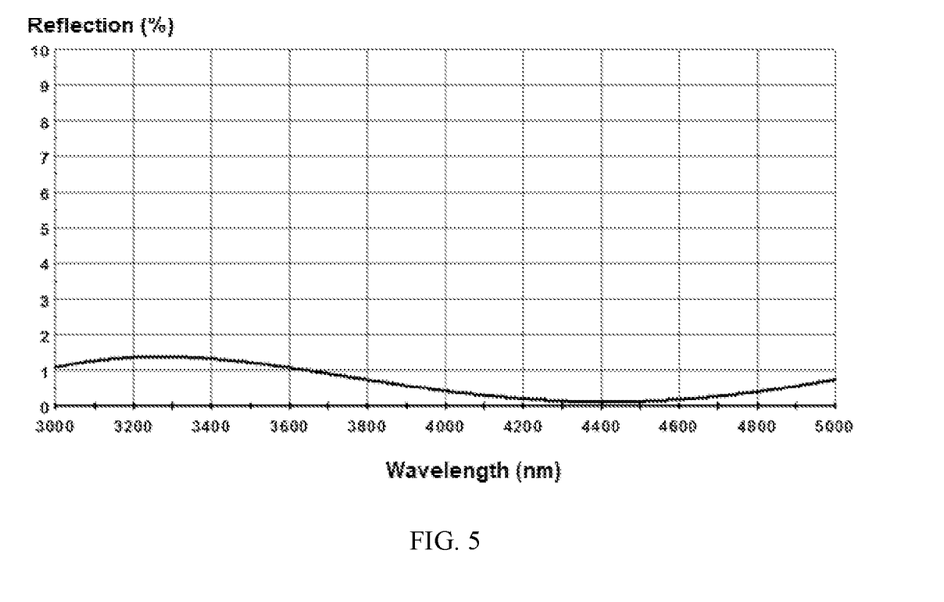
FIG. 5 is a reflection graph of antireflection optical coating which transmits only middle infra-red beams in one embodiment of the invention.

The antireflection optical coating layers which only transmit near infra-red beams in one exemplary embodiment of the present invention are given in the following Table 3. This exemplary embodiment is an optical coating to be coated on E surface (E) of the second prism (3) in ZnSe formulation.

In the example reference wavelength is 4000 nm and its coming angle is 0°. Also in mentioned exemplary embodiment, the refractive graph of the optical coating is shown in the following table 6.

TABLE 3

| Layer | Material | Refractive Index | Optical Thickness (QWOT) | Physical Thickness (nm) |
|---|---|---|---|---|
| Ambient | Air | 1 | | |
| 1 | SiO2 | 1.39 | 0.96 | 690.39 |
| 2 | Ge | 4.24 | 0.13 | 30.72 |
| 3 | SiO2 | 1.39 | 0.28 | 202.96 |
| Substrate | ZnSe | 2.43 | | |
| Total thickness | | | 1.37 | 924.07 |

Figure 6:
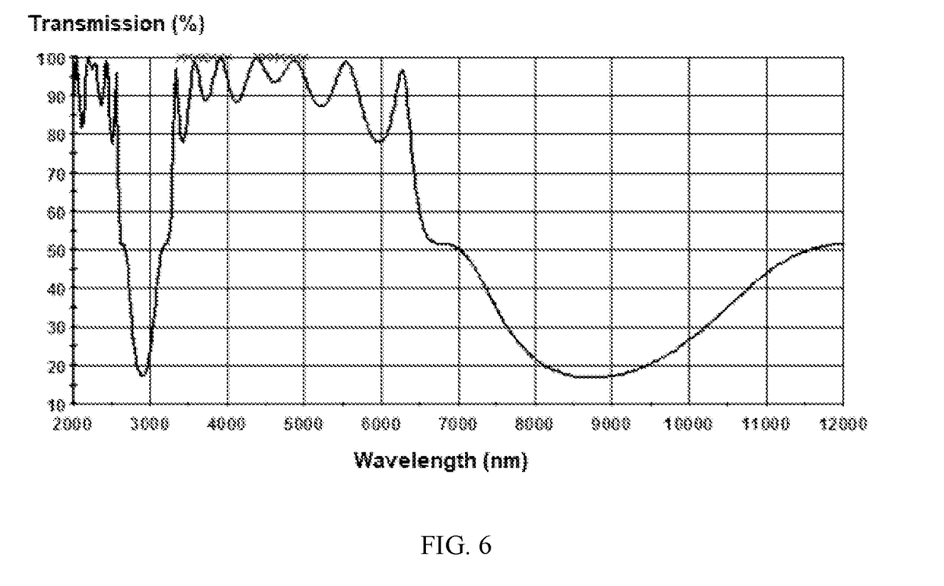
FIG. 6 is a transmission graph of a coating which reflects far infra-red beams and transmits middle infra-red beams in one embodiment of the invention.

The optical coating layers which reflect far infra-red beams and transmit middle infra-red beams in one exemplary embodiment of the present invention are given in the following Table 4. This exemplary embodiment is an optical coating which is coated onto C surface (C) of the first prism (2) or onto D surface (D) of the second prism (3) in the ZnSe formulation or to be coated onto the C surface (C) and D surface (D) of the layers mentioned in the table in a shared manner. In the example reference wavelength is 8000 nm and its coming angle is 45°. Also in mentioned exemplary embodiment, the refractive graph of the optical coating is shown in the following table 7.

TABLE 4

| Layer | Material | Refractive Index | Optical Thickness (QWOT) | Physical Thickness (nm) |
|---|---|---|---|---|
| Ambient | ZnSe | 2.42 | | |
| 1 | Ge | 4.20 | 1.19 | 567.46 |
| 2 | ZnS | 2.24 | 1.69 | 1507.81 |
| 3 | Ge | 4.20 | 1.20 | 572.28 |
| 4 | ZnS | 2.24 | 1.68 | 1503.61 |
| 5 | Ge | 4.20 | 1.19 | 565.08 |
| 6 | ZnS | 2.24 | 1.70 | 1514.6 |
| 7 | Ge | 4.2 | 1.18 | 559.76 |
| Substrate | TiO2 | 2.25 | | |
| Total thickness | | | 9.83 | 6790.61 |

Figure 7:
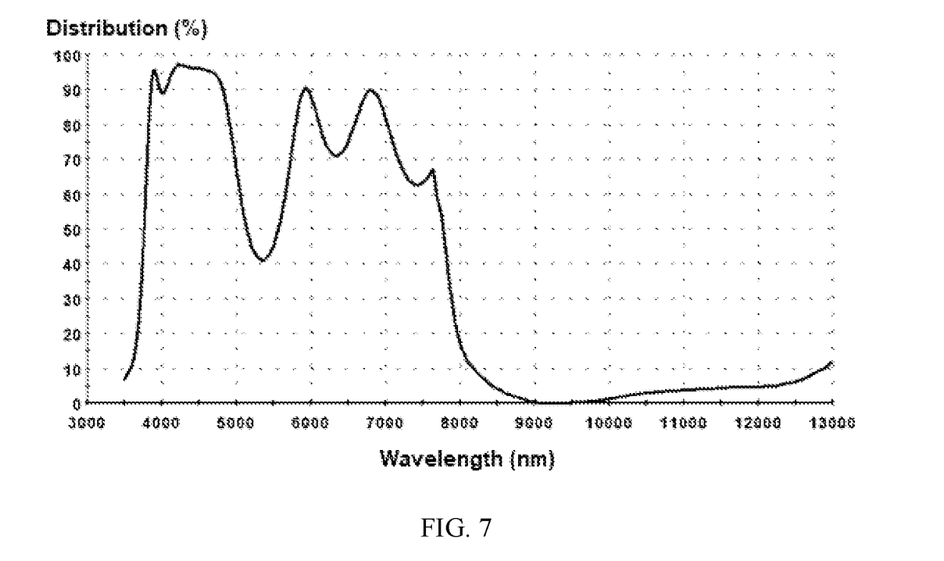
FIG. 7 is a beam distribution graph according to the wavelength showing total theoretical performance of the beam splitter prism set in one embodiment of the invention.

The coating structure of the beam splitter prism set (1) in the transmission direction in the exemplary embodiment of the present invention is given in the following table 5. Also the total theoretical performance of the beam splitter prism set (1) in said exemplary embodiment is given in FIG. 7.

TABLE 5

| Surface | Pre Material | Subsequent Material | Surface Angle | Transmission Mode | Coating Direction |
|---|---|---|---|---|---|
| A Surface (A) | Air | ZnSe | 0° | Transmit | Forward direction |
| C Surface (C) | ZnSe | TiO2 | 45° | Transmit | Forward direction |
| D Surface (D) | TiO2 | ZnSe | 45° | Transmit | Opposite direction |
| E Surface (E) | ZnSe | Air | 0° | Transmit | Opposite direction |

Method for Joining Surface (C) and D Surface (D) with Each Other

Previously in a preferred embodiment of the present invention, sol-gel based solution described under "The Production Method of the Adhesive in Ti(IV) Ax Formulation" heading is first of all applied on the C surface (C) or D surface (D) by means of utilizing from the methods such as spin coating, spray coating, dip coating and the like. The thin film coating is gently compressed between the surfaces and then the joining process of the two surfaces is realized. Subsequently the joining process is completed by means of drying the joined layer in a film form by subjecting it to a thermal process. At the end of the thermal treatment, the adhesive is transformed into a solid phased nonorganic adhesive form consisting of a single metal oxide (A Component in MyAx salt formulation described under the title "An Adhesive for Middle-Far Infra-red Optical Elements"). Thus a single phased adhesive is positioned between the C surface (C) and D surface (D). As a result of creating a single phased adhesive, the absorption of the light within the adhesive and affecting the optical features of the prisms in a negative manner are eliminated.

The prisms in mentioned ZnX formulation are very sensitive against temperature. The critical temperature for drying process of the adhesive without damaging the crystal structures of the prisms is at most 150° C. Open or controlled atmosphere ovens are not preferred due to the possible serious damages that it can give to the performances of the prisms. For this reason in a preferred embodiment of the present invention, microwave method is used for the thermal process.

In one embodiment of the present invention when the first prism (2) and the second prism (3) is joined, in order to strengthen the joint between C surface (C) and D surface (D), for increasing the adhesion force, a TiO2 interlayer with an anatase structure is added. In one embodiment of the present invention the Physical Vapor Deposition-PVD method which is one of the physical vaporization methods is used and TiO2 interlayer is enlarged. While TiO2 interlayer is enlarged by means of the sol-gel method, in order not to damage the crystal structures of the prisms mentioned previously, TiO2 interlayer with anatase structure is enlarged under 150° C. Preferably it is produced with the microwave source which can be changed between 1 W (watt) and 1000 W and under reaction conditions between 5° C. and 150° C.

In an exemplary embodiment of the present invention [Ti(IV) butox solution] the method for joining C surface (C) or D surface (D) with the adhesive is as the following:

Materials

[Preferably 3 ml] Ti(IV) butoxide (97%)-isopropanol

[Preferably 25 ml] acetyl acetone

Mixing Process

Preferably for 15 minutes at 200 rpm at approximately room temperature in a magnetic stirrer Coating Spin coating Approximately 5 seconds, 250 rpm Approximately 90 seconds, 1500 rpm Coated substrate (C surface (C) or D surface (D)) is adhered for 5 minutes at approximately room temperature Thermal Process In a microwave oven preferably under 800 W power, at a temperature under 150° C. (preferably 80° C.'de) and for approximately 20 minutes.

Figure 8:
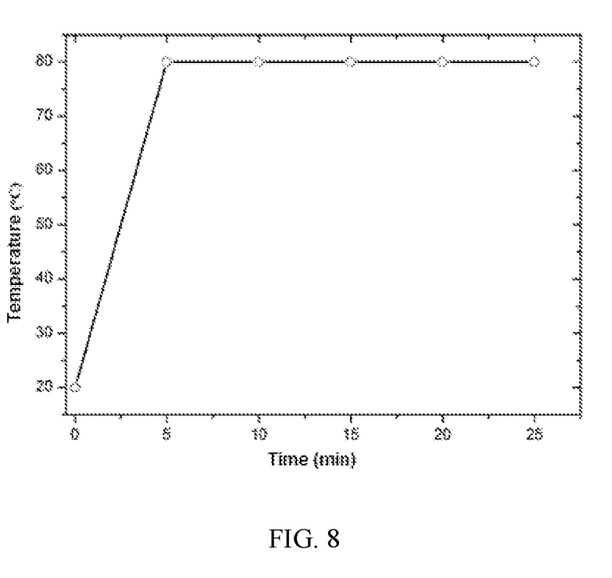
FIG. 8 temperature-time graph of the thermal treatment applied in the combination method of C surface (C) or D surface (D) with the adhesive in an exemplary embodiment of the invention wherein Ti(IV) butox solution is used.

The thermal process application with the temperature-time curve shown in FIG. 8 used in the microwave oven is given in the following.

20° C.-80° C. (heating step), 5 minutes
80° C., 20 minutes
Cooling to the room temperature in 5 minutes In the exemplary embodiment of the present invention in which the above summarized Ti(IV) butox solution is used, the method for joining the C surface (C) or D surface (D) with the adhesive comprises the following steps.

First of all [preferably 3 ml] Ti(IV) butoxide solution [preferably 97% isopropanol solution] and [preferably 25 ml] acetyl acetone mixture is stirred in a magnetic stirrer at room temperature at approximately 200 rpm speed for approximately 15 minutes. Then C surface (C) or D surface (D) are coated with said mixture by means of spin coating method for approximately 5 seconds duration at 250 rpm, subsequently for approximately 90 seconds duration at 1500 rpm. Then C surface (C) and D surface (D) is joined and the first prism (2) and second prism (3) are bonded by applying pressure on surfaces with a predetermined value during approximately 5 minutes. Subsequently preferably under power of 800 W in a microwave oven, thermal process is applied for 5 minutes by starting with approximately 20° C. up to 80° C. Immediately after 5 minute thermal process, thermal process is continued at 80° C. for 20 minutes (see FIG. 8). After 20 minutes thermal process at 80° C., it is cooled to the room temperature in 5 minutes.

In another exemplary embodiment of the present invention [nano $TiO_2$ solution] the method for joining the C surface (C) or D surface (D) with the adhesive comprises the following steps.

Materials
  [Preferably 3 ml] Ti(IV) butoxide (% 97)-isopropanol
  [Preferably 20 ml] nano $TiO_2$ solution
  [Preferably 5 ml] isopropanol
Mixing
  For 15 minutes at approximately 200 rpm at room temperature in a magnetic stirrer
Coating
  Spin coating
    Approximately 5 seconds, 250 rpm
    Approximately 90 seconds, 1500 rpm
    Coated substrate (C surface (C) or D surface (D)) is adhered for 5 minutes at approximately room temperature
Thermal Process
  It is realized preferably under power of 800 W in a microwave oven, at a temperature under 150° C. (preferably at 80° C.) and for approximately 20 minutes.

In an exemplary embodiment of the present invention wherein the above summarized nano $TiO_2$ solution is used, the method for joining the C surface (C) or D surface (D) with the adhesive comprises the following steps.

First of all [preferably 3 ml] 97% isopropanol solution of Ti(IV) butoxide, [preferably 20 ml] nano $TiO_2$ solution and [preferably 5 ml] isopropanol mixture is stirred with a magnetic stirrer at room temperature at approximately 200 rpm speed and for approximately 15 minutes. Subsequently C surface (C) or D surface (D) are coated with said mixture by means of the spin coating method for approximately 5 seconds at approximately 250 rpm, then for approximately 90 seconds at approximately 1500 rpm. Then C surface (C) and D surface (D) is joined and the first prism (2) and second prism (3) are bonded by applying pressure on surfaces with a predetermined value for approximately 5 minutes. Subsequently preferably under power of 800 W in a microwave oven, thermal process is applied approximately for 20 minutes at a temperature under 150° C. (preferably 80° C.).

Figure 9:
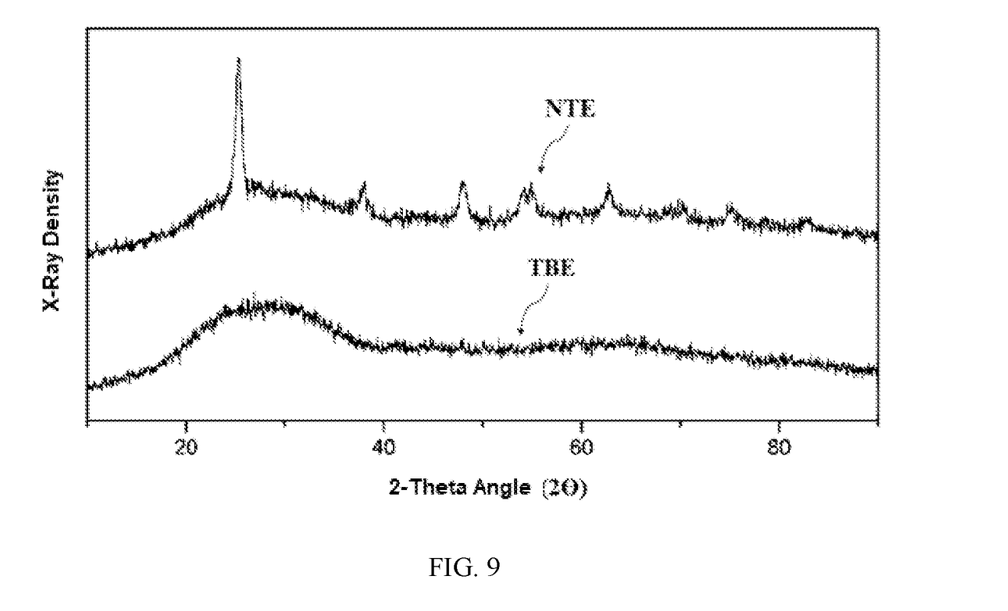
FIG. 9 X-ray diffraction graph of the adhesives obtained by using Ti(IV) butox solution and nano $TiO_2$ solution.

X-rays diffraction curves which are obtained by means of using two different methods mentioned above between C surface (C) and D surface (D) are shown in the FIG. 9. In FIG. 9, X-rays diffraction curve of the adhesive created by using nano $TiO_2$ solution is named as nano $TiO_2$ solution curve (NTE) and X-rays diffraction curve of the adhesive created by means of using Ti(IV) butox solution is named as Ti(IV) butox solution curve (TBE). In the adhesive obtained by using nano $TiO_2$ solution, although a crystal structure belong to titanium dioxide ($TiO_2$) is observed, in the adhesive obtained by means of Ti(IV) butox solution, only an amorphous structure is observed.

The crystal structure belonging to the titanium dioxide ($TiO_2$) in the adhesive, obtained by means of using nano $TiO_2$ solution, does not cause a shift or interference on the quality of display received from the electro-optical monitoring systems (GS).

The following elements which are shown in figures;
  Optical sensor (S1) sensitive to the near (3-5 μm) infra-red beams
  Optical sensor (S2) sensitive to the far (8-12 μm) infra-red beams
  Optical unit (O)
  Electro-optical monitoring system (GS) are not an integral part of the present invention, their aim is to illustrate an exemplary embodiment of the middle-far infra-red beam splitter prism set (1).

What is claimed is:

1. A beam splitter prism set for electro-monitoring systems, wherein the beam splitter prism set uses middle and far infra-red beams, comprising:
  an adhesive for middle-far infra-red optical elements comprising a composition expressed as $M_yA_x$ as a general formulation of the adhesive, wherein M expresses a first element selected from a group consisting of Hf, Zn, Ni, Ti and Y, A expresses a second element selected from a group consisting of O and S, and x and y are real numbers,
  a first prism and a second prism, wherein the first prism and the second prism are optical right triangle prisms, and hypotenuses of the first prism and the second prism are joined facing each other,
  a vertical A surface of the first prism, wherein the vertical A surface of the first prism is covered by a first antireflection optical coating, wherein the first antireflection optical coating only transmits the middle and far infra-red beams,
  a vertical B surface of the first prism, wherein the vertical B surface of the first prism is coated by a second antireflection optical coating, wherein the second antireflection optical coating only transmits far infra-red beams of 8-12 μm,
  a vertical E surface of the second prism, wherein the vertical E surface of the second prism is parallel with the vertical A surface coated with a third antireflection optical coating, wherein the third antireflection optical coating only transmits middle infra-red beams of 3-5 μm, a fourth antireflection optical coating reflecting the far infra-red beams and transmitting the middle infra-red beams, wherein the fourth antireflection optical coating is located between a hypotenuse C surface of the first prism and a hypotenuse D surface of the second prism, wherein the adhesive for middle-far infra-red optical elements is used for bonding the hypotenuse C surface and the D hypotenuse surface.

2. The beam splitter prism set according to claim 1, wherein the first prism and the second prism are in ZnX formulation, wherein X is Se or S elements.

3. The beam splitter prism set according to claim 2, wherein the first prism is produced from ZnSe material and the second prism is produced from ZnS material.

4. The beam splitter prism set according to claim 3, wherein a $TiO_2$ layer located between the hypotenuse C surface and the hypotenuse D surface.

5. The method for joining the first prism and the second prism according to claim 3, comprising the following process steps:
stirring 97% isopropanol solution of Ti(IV) butoxide and acetyl acetone mixture with a magnetic stirrer at 200 rpm speed approximately 15 minutes;
subsequently coating the hypotenuse C surface or the hypotenuse D surface with the 97% isopropanol solution of Ti butoxide and acetyl acetone mixture by means of a spin coating method approximately 5 seconds at 250 rpm, then approximately 90 seconds at 1500 rpm;
subsequently joining the hypotenuse C surface and the hypotenuse D surface and compressing and bonding the first prism and the second prism by applying a pressure with a predetermined value onto a surface approximately 5 minutes to obtain a bonded first prism and second prism;
subsequently applying a thermal process to the bonded first prism and second prism in a microwave oven starting from 20° C. up to 80° C. approximately 5 minutes;
subsequently continuing the thermal process at a temperature under 150° C.; and
subsequently cooling to a room temperature approximately 5 minutes.

6. The method for joining the first prism and the second prism according to claim 3, comprising the following process steps:
stirring approximately 97% isopropanol solution of Ti(IV) butoxide, nano $TiO_2$ solution and isopropanol mixture with a magnetic stirrer at approximately room temperature at 200 rpm speed approximately 15 minutes;
subsequently coating the hypotenuse C surface or the hypotenuse D surface with the approximately 97% isopropanol solution of Ti(IV) butoxide, nano $TiO_2$ solution and isopropanol mixture by means of a spin coating method approximately 5 seconds at 250 rpm, then approximately 90 seconds at 1500 rpm;
subsequently joining the hypotenuse C surface and the hypotenuse D surface and compressing and bonding the first prism and the second prism by applying a pressure with a predetermined value onto a surface approximately 5 minutes to obtain a bonded first prism and second prism;
subsequently applying a thermal process to the bonded first prism and second prism in a microwave oven at a temperature under 150° C.

7. The method for joining the first prism and the second prism according to claim 2, comprising the following process steps:
stirring 97% isopropanol solution of Ti(IV) butoxide and acetyl acetone mixture with a magnetic stirrer at 200 rpm speed approximately 15 minutes;
subsequently coating the hypotenuse C surface or the hypotenuse D surface with the 97% isopropanol solution of Ti butoxide and acetyl acetone mixture by means of a spin coating method approximately 5 seconds at 250 rpm, then approximately 90 seconds at 1500 rpm;
subsequently joining the hypotenuse C surface and the hypotenuse D surface and compressing and bonding the first prism and the second prism by applying a pressure with a predetermined value onto a surface approximately 5 minutes to obtain a bonded first prism and second prism;
subsequently applying a thermal process to the bonded first prism and second prism in a microwave oven starting from 20° C. up to 80° C. approximately 5 minutes;
subsequently continuing the thermal process at a temperature under 150° C.; and
subsequently cooling to a room temperature approximately 5 minutes.

8. The method for joining the first prism and the second prism according to claim 2, comprising the following process steps:
stirring approximately 97% isopropanol solution of Ti(IV) butoxide, nano $TiO_2$ solution and isopropanol mixture with a magnetic stirrer at approximately room temperature at 200 rpm speed approximately 15 minutes;
subsequently coating the hypotenuse C surface or the hypotenuse D surface with the approximately 97% isopropanol solution of Ti(IV) butoxide, nano $TiO_2$ solution and isopropanol mixture by means of a spin coating method approximately 5 seconds at 250 rpm, then approximately 90 seconds at 1500 rpm;
subsequently joining the hypotenuse C surface and the hypotenuse D surface and compressing and bonding the first prism and the second prism by applying a pressure with a predetermined value onto a surface approximately 5 minutes to obtain a bonded first prism and second prism;
subsequently applying a thermal process to the bonded first prism and second prism in a microwave oven at a temperature under 150° C.

9. The beam splitter prism set according to claim 1, wherein a $TiO_2$ layer is located between the hypotenuse C surface and the hypotenuse D surface.

10. The method for joining the first prism and the second prism according to claim 9, comprising the following process steps:
stirring 97% isopropanol solution of Ti(IV) butoxide and acetyl acetone mixture with a magnetic stirrer at 200 rpm speed approximately 15 minutes;
subsequently coating the hypotenuse C surface or the hypotenuse D surface with the 97% isopropanol solution of Ti butoxide and acetyl acetone mixture by means of a spin coating method approximately 5 seconds at 250 rpm, then approximately 90 seconds at 1500 rpm;
subsequently joining the hypotenuse C surface and the hypotenuse D surface and compressing and bonding the first prism and the second prism by applying a pressure with a predetermined value onto a surface approximately 5 minutes to obtain a bonded first prism and second prism;

subsequently applying a thermal process to the bonded first prism and second prism in a microwave oven starting from 20° C. up to 80° C. approximately 5 minutes;

subsequently continuing the thermal process at a temperature under 150° C.; and subsequently cooling to a room temperature approximately 5 minutes.

11. A method for joining the first prism and the second prism according to claim 1, comprising the following process steps:

stirring 97% isopropanol solution of Ti(IV) butoxide and acetyl acetone mixture with a magnetic stirrer at 200 rpm speed approximately 15 minutes;

subsequently coating the hypotenuse C surface or the hypotenuse D surface with the 97% isopropanol solution of Ti butoxide and acetyl acetone mixture by means of a spin coating method approximately 5 seconds at 250 rpm, then approximately 90 seconds at 1500 rpm;

subsequently joining the hypotenuse C surface and the hypotenuse D surface and compressing and bonding the first prism and the second prism by applying a pressure with a predetermined value onto a surface approximately 5 minutes to obtain a bonded first prism and second prism;

subsequently applying a thermal process to the bonded first prism and second prism in a microwave oven starting from 20° C. up to 80° C. approximately 5 minutes;

subsequently continuing the thermal process at a temperature under 150° C.; and subsequently cooling to a room temperature approximately 5 minutes.

12. A method for joining the first prism and the second prism according to claim 1, comprising the following process steps:

stirring approximately 97% isopropanol solution of Ti(IV) butoxide, nano $TiO_2$ solution and isopropanol mixture with a magnetic stirrer at approximately room temperature at 200 rpm speed approximately 15 minutes;

subsequently coating the hypotenuse C surface or the hypotenuse D surface with the approximately 97% isopropanol solution of Ti(IV) butoxide, nano $TiO_2$ solution and isopropanol mixture by means of a spin coating method approximately 5 seconds at 250 rpm, then approximately 90 seconds at 1500 rpm;

subsequently joining the hypotenuse C surface and the hypotenuse D surface and compressing and bonding the first prism and the second prism by applying a pressure with a predetermined value onto a surface approximately 5 minutes to obtain a bonded first prism and second prism;

subsequently applying a thermal process to the bonded first prism and second prism in a microwave oven at a temperature under 150° C.

13. A method for joining the first prism and the second prism according to claim 1, the following process steps:

stirring approximately 97% isopropanol solution of 3 ml Ti(IV) butoxide and 25 ml acetyl acetone mixture with a magnetic stirrer at approximately room temperature at 200 rpm speed approximately 15 minutes;

subsequently coating the hypotenuse C surface or the hypotenuse D surface with the approximately 97% isopropanol solution of 3 ml Ti(IV) butoxide and 25 ml acetyl acetone mixture by means of aspin coating method approximately 5 seconds at 250 rpm, then approximately 90 seconds at 1500 rpm;

subsequently joining the hypotenuse C surface and the hypotenuse D surface and compressing and bonding the first prism and the second prism by applying a pressure with a predetermined value onto a surface approximately 5 minutes to obtain a bonded first prism and second prism;

subsequently applying a thermal process to the bonded first prism and second prism in a microwave oven starting from 20° C. up to 80° C. approximately 5 minutes;

subsequently continuing the thermal process at a temperature under 150° C.;

subsequently cooling to a room temperature approximately 5 minutes.

14. A method for joining the first prism and the second prism according to claim 1, comprising the following process steps:

stirring approximately 97% isopropanol solution of 3 ml Ti(IV) butoxide, 20 ml nano $TiO_2$ solution and 5 ml isopropanol mixture with a magnetic stirrer at approximately room temperature at 200 rpm speed approximately 15 minutes;

subsequently coating the hypotenuse C surface or the hypotenuse D surface with the approximately 97% isopropanol solution of 3 ml Ti(IV) butoxide, 20 ml nano $TiO_2$ solution and 5 ml isopropanol mixture by means of a spin coating method approximately 5 seconds at 250 rpm, then approximately 90 seconds at 1500 rpm;

subsequently joining the hypotenuse C surface and the hypotenuse D surface and compressing and bonding the first prism and the second prism by applying a pressure with a predetermined value onto a surface approximately 5 minutes to obtain a bonded first prism and second prism;

subsequently applying a thermal process to the bonded first prism and second prism in a microwave oven at a temperature under 150° C.

15. The beam splitter prism set according to claim 1, wherein the first prism is produced from ZnSe material and the second prism is produced from ZnS material.

* * * * *